United States Patent [19]
Bossotto et al.

[11] Patent Number: 6,065,199
[45] Date of Patent: May 23, 2000

[54] DEVICE FOR ASSEMBLING MOTOR-VEHICLE BODIES OR SUB-ASSEMBLIES THEREOF, HAVING AN INTEGRATED DEFORMATION DETECTION SYSTEM, AND ASSEMBLING METHOD MAKING USE OF THIS DEVICE

[75] Inventors: Piero Bossotto; Luigi Chiorino, both of Turin, Italy; David J. Bickerstaff, Vaduz, Liechtenstein

[73] Assignee: Comau S.p.A., Turin, Italy

[21] Appl. No.: 09/145,347

[22] Filed: Sep. 1, 1998

[30] Foreign Application Priority Data

Jun. 1, 1998 [EP]  European Pat. Off. .............. 98830335

[51] Int. Cl.$^7$ .................................................. B23Q 17/00
[52] U.S. Cl. ........................... 29/407.01; 29/709; 29/559; 700/114; 198/345
[58] Field of Search ................................ 29/407.01, 709, 29/559, 281.5; 228/6.1, 4.1, 44.3, 212; 269/329; 700/114, 57, 95, 96, 213, 228, 230; 198/345.1

[56] References Cited

U.S. PATENT DOCUMENTS

| | | | |
|---|---|---|---|
| 5,155,690 | 10/1992 | Nomaru et al. | 364/468 |
| 5,267,683 | 12/1993 | Hamada et al. | 228/4.1 |
| 5,400,943 | 3/1995 | Rossi | 228/6.1 |
| 5,902,496 | 5/1999 | Alborante | 219/86.24 |
| 6,018,685 | 1/2000 | Fujita et al. | 700/61 |

Primary Examiner—S. Thomas Hughes
Assistant Examiner—John C. Hong
Attorney, Agent, or Firm—Sughrue, Mion, Zinn, Macpeak & Seas, PLLC

[57] ABSTRACT

A station for assembling motor-vehicle bodies or subassemblies thereof comprises an integrated system for detecting the micro-deflections of the side locating gates which engage the body during the assembling operation, with the resulting possibility of calculating the forces along a direction transverse to the longitudinal direction of the assembling station, to which the assembled structure is subjected.

8 Claims, 4 Drawing Sheets

| TOP OF GATE DEFLECTION MM | AVG FRONT | | |
|---|---|---|---|
| | 0,147 | | |
| AVG LHS | 0,142 | 0,073 | AVG RHS |
| 0,194 | LHF | RHF | 0,100 |
| 0,091 | LHR | RHR | 0,045 |
| | 0,068 | | |
| | AVG REAR | | |

DEVICE FOR ASSEMBLING MOTOR-VEHICLE BODIES OR SUB-ASSEMBLIES THEREOF, HAVING AN INTEGRATED DEFORMATION DETECTION SYSTEM, AND ASSEMBLING METHOD MAKING USE OF THIS DEVICE

BACKGROUND OF THE INVENTION

The present invention relates to devices for assembling motor-vehicle bodies or sub-assemblies thereof. The invention is applicable to devices for assembling vehicles of any type, such as cars, light or heavy trucks or the like. In particular, the invention relates to devices for assembling structures made of pressed sheet metal by electric spot welding. However, the invention is also applicable to any other assembling system, such as by adhesive, as well as to any other material, such as plastic or composite materials.

More in detail, the invention relates to devices for assembling motor-vehicle bodies or subassemblies thereof, of the known type comprising:

an assembling station, provided with programmable assembling means, conveyor means, for carrying at least a portion of the structure to be assembled into the assembling station as well as for taking the structure after that it has been assembled out of the assembling station, at least one pair of locating and locking gates arranged on two opposite sides of the assembling station, provided with locating and locking devices for holding the component elements of the structure to be assembled in the proper assembling position, while the assembling operation is being carried out, said gates being movable towards and away from each other, between a spaced inoperative condition, in which said locating and locking devices are disengaged from the structure to be assembled, and a closed operative condition, in which said locating and locking devices are able to engage the structure to be assembled.

Assembling devices of the above indicated type are well known and have been used for a long time. For example, the Applicant has been producing and marketing a flexible welding system identified under the trademark "ROBOGATE" for years, whose basic concept has been shown originally in U.S. Pat. No. 4,256,957 and parallel German patent No. 28 10 822 and which gave rise with the time to a number of subsequent improvements and variants which also have formed the subject of respective patents of the Applicant. The ROBOGATE system has indeed determined a break-through in the welding technique of motor-vehicle bodies which was generally used until the end of the seventies and has replaced the apparatus previously used with many car manufacturers all around the world. In a basic version of the system, it comprises two or more pairs of locating gates which are rapidly interchangeable at the welding station and are adapted to operate on respective types of bodies. The system is able to operate on bodies even very different from each other, so that a same line can be used for producing different models. A further advantage of the ROBOGATE system lies in that it can be adapted by relatively simple and rapid operation, and hence with very reduced investments, to the production of a new body model. Another advantage lies in that a uniform quality of all the models of a same type on which the system operates is assured.

The present invention can be applied both to a flexible station using many pairs of locating gates, and also to a "rigid" station, comprising a single pair of locating gates which are for operating on a single body model.

In the case of the above described known devices, the assembling means are constituted by programmable robots provided with heads for electric spot welding. However, as already indicated, the present invention can be applied whatever is the technology used for connecting the various parts of the structure together.

A further feature of the above described known device, lies in that the structure to be welded reaches the welding station after it has been loosely assembled. Devices of the same type are also known, in which only a portion of the structure to be welded is caused to enter in to the welding station, the remaining parts which are necessary for forming the complete structure to be welded being fed separately to the welding station and connected there with each other. The present invention may be identically applied also to devices of this type.

Following the above mentioned patents relating to the basic version of the ROBOGATE system, the Applicant has filed further patents relating to various improvements and variants of this system. A recent improvement has formed the subject of European patent application EP-A-0 642 878 which has been mentioned above already. In this document a welding station is disclosed which has a much less complicated, light and more flexible structure with respect to the prior embodiments of the ROBOGATE system. In the most conventional solutions, the above mentioned locating gates are slidably guided, in order to render them rapidly interchangeable at the welding station with the gates provided for a different type of body to be welded, on overhead guides directed parallel to the direction of the conveyor line at the welding station, which requires the provision of heavy fixed supporting frameworks. These frameworks, beyond contributing greatly to the cost and the bulk of the welding station, also render difficult for the welding robots to find the necessary space in order to operate on the body to be welded. In the solution described in European patent application EP-A-0 642 878, each locating gate is movable independently from the other gates since it is provided with a lower self-propelled cart guided on a rail provided along the floor of the welding station. Therefore, the locating gates do not require any longer the provision of longitudinal overhead guides extending throughout the whole length between their working position at the welding station and their waiting position spaced from the welding station, so that also the provision of the heavy and bulky supporting framework, usually constituted by gantry-like structures connected with each other longitudinally, which was necessary in the classic ROBOGATE plants is no longer needed. Thus, the space available for the welding robots is greatly increased, which also enables, if desired, the number of robots to be increased in order to obtain an increase of the number of welding spots carried out within a predetermined time. The robot may access much more easily to all the regions of the body to be welded in order to carry out proper welding. Furthermore, since each locating gate is movable independently from the other gates, the pitch between each gate and the subsequent gate along the line is free and variable, which provides a greater flexibility in design and installation of the plant. Finally, the installation itself of the plant is of a more reduced cost with respect to that of more conventional plants. This known system, which has been marketed by the Applicant under the trademark "OPEN-ROBOGATE" has been disclosed in European paten application EP-A-0 642 878 which has been mentioned above with reference to a first embodiment, which relates to the case in which all the components of the structure to be welded are carried to the welding station from said conveyor line, in a condition already preassembled or anyhow with the various elements supported separately from each other, but at positions close to the final assembling position. The further European patent application No. 97830456.6 has proposed a new version of the "OPEN-ROBOGATE" system in which the conveyor line each time feeds only a portion of the structure to be welded (typically the floor panel) to the welding station, whereas the body sides are formed directly on the locating gates, which then attend to bring them into engagement with the floor panel when the gates are moved into their closed operative position. Obviously, in this second version, the so-called toy-tabbing stations which were provided in the most conventional solutions upstream of the welding station, in order to loosely assemble the bodies before welding, are eliminated. Furthermore, the conveyor line becomes simpler and less expensive with respect also to the embodiment shown in European patent application EP-A-0 642 878, since the complete structure of the body is formed starting from its single components only at the welding station and not upstream thereof.

The present invention provides a further improvement of the "OPEN-ROBOGATE" system both with reference to the variant shown in European patent application EP-A-0 642 878, and the variant forming the subject of European patent application No. 97830456.6. Moreover, the invention is applicable both to a station of the above indicated type which is flexible, i.e. comprising many pairs of locating gates rapidly interchangeable with each other in order to adapt themselves to various types of body to be welded, as well as to a rigid station, comprising a single pair of locating gates dedicated to a single body model.

Technical Problem to be Solved

A problem which has been encountered in the past with welding stations of the above described known type, lies in that the assembled structure has a width, i.e. a dimension along a direction transverse relative to the longitudinal direction of the welding station, which not always corresponds to a predetermined theoretical dimension. Even the most modern and sophisticated embodiments do not prevent variations with respect to the predetermined width which at minimum are in the order of some millimeters.

With ROBOGATE stations of conventional type, in which the locating gates are guided by means of rigid supporting frameworks, when the structure to be welded is locked between the locating gates, it is compelled to assume a theoretical configuration. Therefore, when welding is completed and the locating gates are opened leaving the welded structure free, the latter may be subject to a sort of relaxation which takes it to a condition not corresponding to the desired theoretical one. If one wishes to improve the precision of the system by accurately studying the deformation to which the welded structure is subjected, he must provide complicated detection systems using strain gauges, or subsequent offline measurement evaluation which are expensive and involve troublesome test operations.

OBJECT OF THE INVENTION

The object of the present invention is that of providing an assembling device which is provided with an integrated system for detecting the width of the assembled structure, which is simple, inexpensive and of efficient use.

SUMMARY OF THE INVENTION

In view of achieving the above indicated object, the invention provides a device for assembling motor-vehicle bodies or sub-assembly thereof of the type indicated at the beginning of the present description, characterized by the combination of the following features:

a) each locating and locking gate is an independent unit, having a base portion movable in the assembling station and adapted to be rigidly locked to a fixed structure of the station in the above mentioned operative condition of the gate, and an active portion, carrying the above mentioned locating and locking devices, which extends from said base portion and is not connected directly to said fixed structure of the station in the said operative condition of the gate, so as to remain free to undergo micro-deflections along a direction transverse relative to the longitudinal direction of the station, due to variations of the transverse dimension of the structure to be assembled with respect to a theoretical predetermined dimension, b) between said active portion of each locating and locking gate and said fixed structure there are interposed sensor means adapted to detect the micro-displacement of said active portion with respect to said fixed structure due to said micro-deflection, at a predetermined distance from the area where the base portion of the gate is locked to the fixed structure, c) said device further comprises means for processing the signals coming from said sensor means and for calculating the displacement of the various area of the active portion of each locating and locking gate, as a function of the distance from said locked area, as well as for calculating, if desired, the force exchanged between each gate and the structure to be assembled.

The above mentioned feature (a) is known per se and typical of the "OPEN-ROBOGATE" assembling stations of the type which has formed the subject of European patent application EP-A-0 642 878 and 97830456.6. Studies and tests conducted by the Applicant have shown that the locating gates used in stations of this type, being free to undergo micro-deflections (which are anyway substantially lower than 1 mm/100 Newtons) due to the engagement of the gates on the structure to be welded, can be advantageously exploited to detect, in a very simple and rapid way, the forces to which the structure to be assembled is subjected when it is engaged by the locating gates. Thus, for example by positioning a stylus sensor on the fixed structure of the station adjacent to the lower portion of each locating gate, immediately above the locking region where the gate is locked to the fixed structure, it is possible to detect the micro-displacement (typically of an order lower than 0.1 mm) which takes place due to the engagement of the gate on the structure to be welded. This detection enables the displacement of the free portion of the locating gate, at various distances from the said locking region, to be calculated with great precision. The forces exchanged with the structure to be welded along the transverse direction can be determined accordingly, on the basis of a linear relation.

It is thus possible to check the phenomenon in a simple and precise way, so that the station can be adjusted until a precision on the width of the assembled structure much greater than that presently possible is reached. It will be also possible in this way to detect any forces sufficiently great to cause a disengagement of the base portions of the locating gates from the fixed structure to which they are locked, when the gates are closed on the structure to be welded.

As already indicated, the provision of a simple sensor at any point between the fixed structure and a region of the locating gate adjacent thereto will enable length and direction of the micro-deflection to which the structure of the gate is subjected to be detected, so that the value of the outwardly or inwardly directed force to which the structure to be welded is subjected can be detected, according to whether the structure to be assembled is larger or narrower of the theoretical dimension. The detection of the micro-deflection of the locating gates can be used to calculate the value of the force to which the structure is subjected with a very high precision, without the need of the expensive and troublesome detection systems using strain gauges or the like.

The detection system can be used for determining the forces acting on the structure in the various stages of operation of the station, such as during the initial stage when the various components of the structure to be welded are located, when the various components are locked, and during the subsequent welding stage and later on when the locating gates are disengaged and opened at the end of the welding operation. By the system according to the invention it is possible to identify the major sources of any force which is detected during the assembling operation.

The calculation of the forces along a transverse direction (outwardly or inwardly) to which the structure is subjected during assembling represents an essential factor in predicting the probability of the spring back phenomenon of the structure following disengagement of the locating gates. The system according to the invention enables the phenomenon to be controlled and studied easily and precisely, so that the assembling and preceding sub-assembly stations and stamping operations can be set up in the best way.

The device according to the invention is therefore an assembling device which has an integrated system for detecting the width of the assembled structure enabling the phenomenon of any deformation to which the structure is subjected during the assembling operation to be studied, in view of rendering the station able to operate with a very high precision, such as with errors on the transverse dimension of the welded body lower than 1 mm.

The invention also provides a method for assembling motor-vehicle bodies or sub-assemblies thereof making use of the above described device.

In a preferred embodiment of the device according to the invention, the above mentioned sensor means comprise first and second sensor means arranged respectively at the front end and the rear end of each locating and locking gate, so that the detection is carried out at the four front left, front right, rear left and rear right corners of the assembling station.

According to a further preferred feature of the invention, with said processing means there are associated display means able to display an image in plan view of the assembling station, where the values are displayed of a parameter chosen among: the displacement detected by said sensor means, the displacement calculated at the top of each gate, or the resulting force exchanged between each gate and the body, respectively at the four front left, front right, rear left and rear right corners of the assembling station, said image also displaying the average values calculated respectively between the values at the front left and front right corners, between the values at the rear left and rear right corners, between the values at the front right and rear right corners and between the values at the front left and rear left corners.

Preferably, moreover, with each displayed value there is associated a colour, according to a code which associates determinate colours to determined ranges of variation of said parameter. In this manner, the users can promptly verify the proper operation of the system or may carry out if necessary adjusting operations if abnormal situations take place, such as an undesired opening of the two gates at the area where they are rigidly clamped, due to an excessive transverse dimension of the body.

BRIEF DESCRIPTION OF THE DRAWINGS

Further features and advantages of the invention will become apparent from the description which follows with reference to the annexed drawings, given purely by way of non-limiting example, in which:

FIG. 3 shows a detail of FIG. 2, FIGS. 4, 5 show two diagrams which show the principle of operation of the device according to the invention.

DETAILED DESCRIPTION OF A PREFERRED EMBODIMENT

Figure 1:
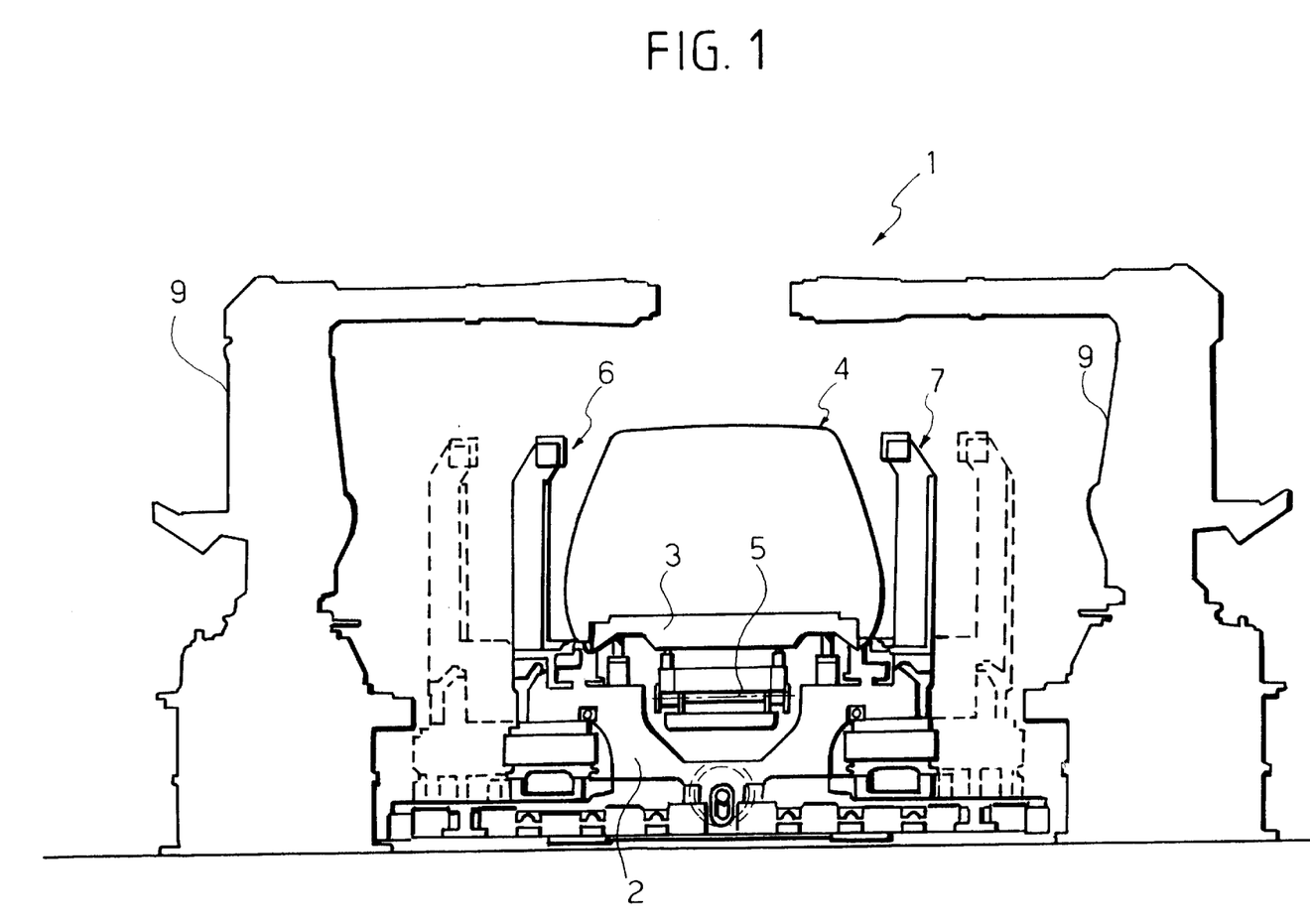
FIG. 1 is a diagrammatic view of a welding station according to the prior art, in a plan transverse to the longitudinal direction of the station.

FIG. 1 generally shows an assembling station for welding motor-vehicle bodies, of the type produced and marketed by the applicant under the trademark "OPEN-ROBOGATE".

According to a technique known per se, the device comprises a welding station 1 including a fixed structure 2 provided with means 3 for receiving, locating and locking the lower portion of a motor-vehicle body 4 which is fed to station 1 by means of a conveyor line 5. The details of construction of these parts are not described nor illustrated herein, since they can be made in any known way and do not fall, taken alone, within the scope of the invention. The invention is applicable both to the case in which the body 4 is loosely assembled upstream of the welding station and carried there by means of line 5, and the case in which the line 5 carries only the lower portion of body 4 to the welding station, whereas the remaining portions (essentially the body sides and upper connecting cross-members) are added to the floor panel at the welding station.

Also according to a known technique, when the body 4 reaches the welding station, it is located and locked by means of a pair of locating and locking gates 6, 7.

Figure 2:
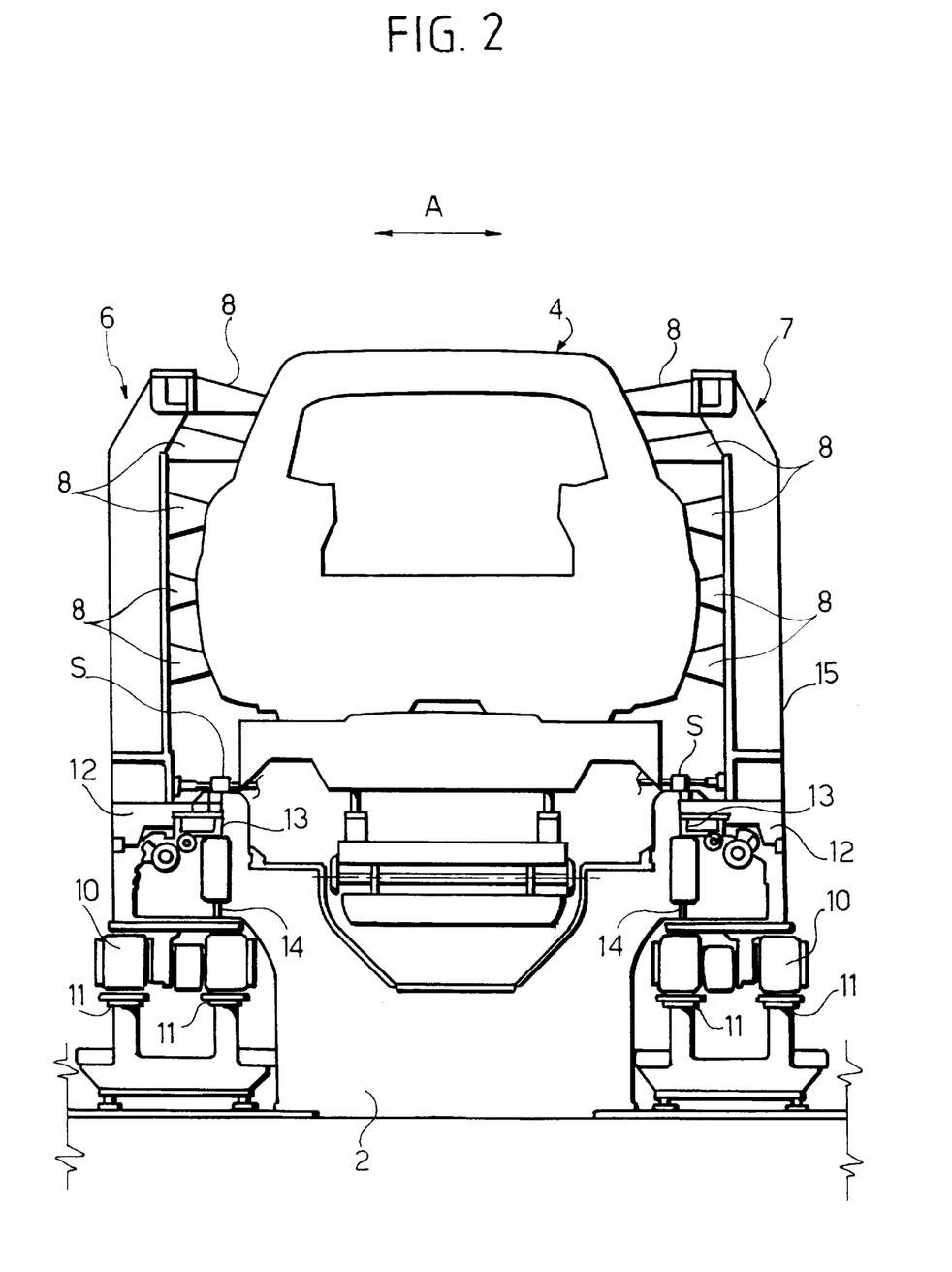
FIG. 2 is a view at an enlarged scale of a welding station according to the invention.

Each of the locating and locking gates 6, 7 is provided with locating and locking devices, diagrammatically shown and designated by 8 in FIG. 2, adapted to engage the body 4 when the gates 6, 7 are carried from an inoperative opened condition (shown by broken line in FIG. 1) to an operative closed condition (shown by solid line in FIGS. 1, 2).

Once the body 4 has thus been locked in the proper position for assembling, it can be welded by means of welding means, such as programmable robots 9 provided with electric spot welding heads. When welding is completed, the locating and locking devices 8 are opened and the locating gates 6, 7 return to their inoperative opened position, to enable the welded body 4 to come out of the welding station while a new structure to be welded enters into the station.

The invention is applicable both to the case in which the welding station 1 comprises a single pair of locating gates 6, 7, provided for a predetermined body model, and the case in which the station is provided with many pairs of locating gates 6, 7 rapidly interchangeable with each other at the work position and adapted to different types of motor-vehicle bodies. In this case, when the locating gates 6, 7 are in their inoperative opened condition (shown by dotted lines in FIG. 1) they are able to move longitudinally for allowing a new pair of locating gates (not shown in the drawing) to enter into the welding station. To this end, also according to a technique known per se, each gate 6, 7 is provided with a lower self-propelled cart 10 guided on rails 11 provided along the floor of the station.

When the locating gates 6, 7 are in their closed operative position, they are rigidly connected and locked to the fixed structure 2 by means of locking devices (not shown in the drawings).

As shown in FIGS. 1, 2, each of the gates 6, 7 has a base portion 12 which is locked to the fixed structure 2. More precisely, in the locked condition, the base portion 12 of each gate 6, 7 is pressed transversally against the fixed structure 2 at two vertical supports 13, 14 which are vertically aligned with each other (shown only diagrammatically in FIG. 2).

As clearly apparent from the foregoing description, each locating gate 6, 7 has its active portion 15 extending upwardly from the base portion 12, which is free from any direct connection to the fixed structure 2 of the welding station.

According to the invention, with each of the locating gates 6, 7 slightly above the upper support 13, there is associated a stylus sensor device S. The device S, whose structure can be of any known type, has a stylus 16 (FIG. 3) adapted to cooperate with a stud 17 rigidly connected to the respective locating gate, so as to be able to detect the displacements of the gate 7 with respect to the fixed structure 2 of the station along a direction A (FIG. 3) transverse relative to the longitudinal direction of the welding station. The sensor S emits a signal which is fed to processing means 18 (FIG. 3) of any type adapted to process and display this signal, as well as to carry out calculations which will be described in the following.

Figure 3:
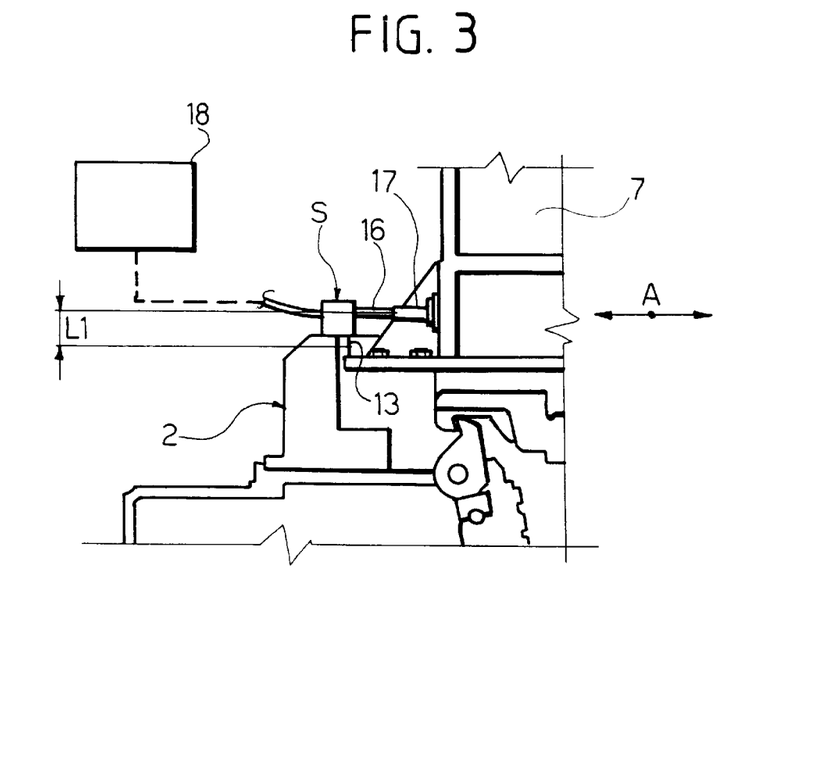

As already discussed above, the width of the body 4 to be welded, i.e. the dimension along the transverse direction A, may be greater or shorter than the theoretical dimension. As a result of this, when the locating gates 6, 7 are brought to their close operative position and the locating and locking devices 8 engage the body 4, micro-deflections (which are anyway not greater than 1 mm/1000 Newtons) of the upper free portions 15 of the two locating gates 6, 7 may take place. These micro-deflections can be advantageously exploited, since they enable the forces exchanged between the locating gates 6, 7 and the structure 4 along the transverse direction A to be determined. This is done by detecting the micro-displacement of each gate 6, 7 where the sensor S is located, i.e. at a distance $L_1$ along the vertical direction from the upper support 13 of the fixed structure 2. As a result, the micro-displacement of the various parts of each gate 6, 7 at various distances L along the vertical direction from support 13 can be detected and the resulting forces exchanged along the transverse direction A between gates 6, 7 and the body can be calculated according to a proportional relationship.

The device according to the invention is therefore provided with an integrated system for detecting the transverse dimensions of the body and the forces to which it is subjected during the assembling operation, by which it is possible to obtain, in an extremely easy and at the same time precise way, a complete picture of the phenomenon of the deformations to which the body is subjected during the assembling operation.

With the aid of the device according to the invention it is therefore possible to improve the set up of the welding system, by studying the deformations induced in the structure, determining the sources of the forces generated and carrying out corrections accordingly, until a dimensional quality of the welded structure is obtained which is exceptional with respect to the presently possible standards.

Figure 4:
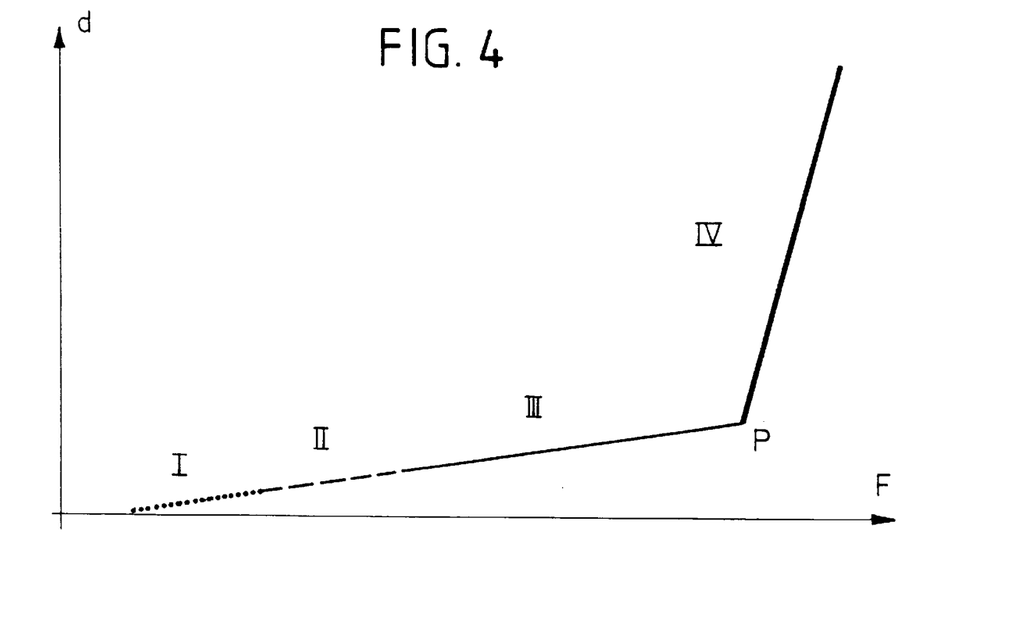
Figure 5:
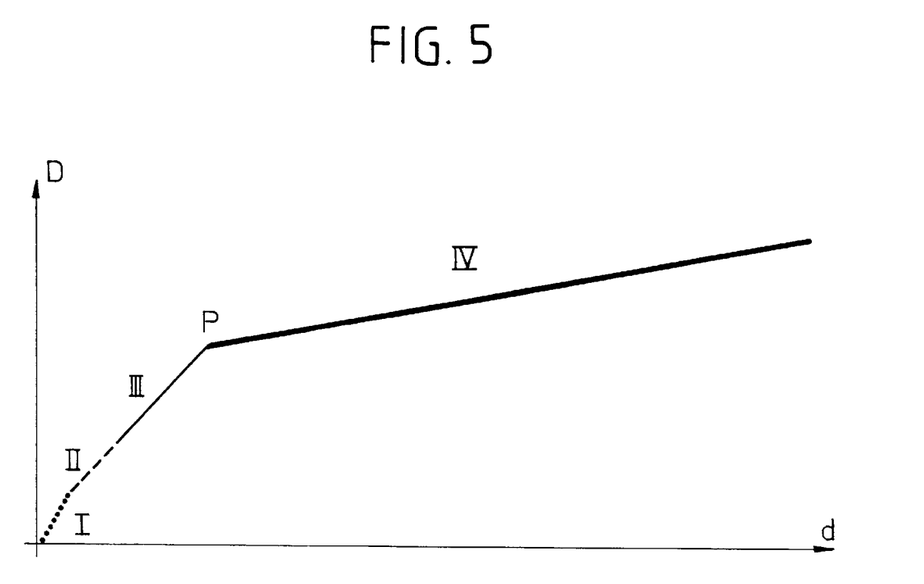
Figure 6:
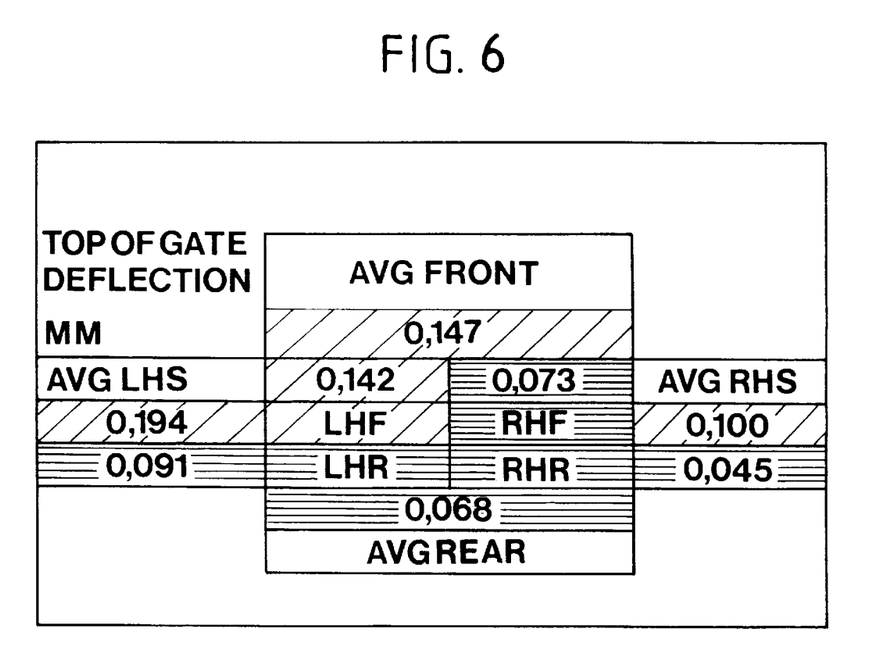
FIG. 6 is a diagrammatic view of the image displayed on a video terminal associated with the processing means provided in the device according to the invention.

FIGS. 4, 5 are two diagrams which respectively show the relationship between the linear displacement detected by sensor S, designated by d and, in the case of FIG. 4, the resulting force f exchanged between the respective frame 6 or 7 and the motor vehicle body, and, in the case of FIG. 5, the displacement D calculated in the manner which has been described above, at the upper end of the gate. As shown, both diagrams show linear correlations with a slope variation at a point P for the deformation value at which an undesired opening of the locating gates 6, 7 takes place at supports 13, 14, due to an excessive transverse dimension of the body. In these diagrams, four areas I, II, III, IV are identified corresponding to four different ranges of variation of the above mentioned parameters. Area I is a range of ideal operation, whereas area IV is a range of abnormal operation, which requires immediate intervention by the operators. As it will become readily apparent in the following, a different colour is assigned, for all practical purposes, to each of these areas, so as to provide an immediately perceivable display of the operating conditions of the system. For example, with areas I, II, III and IV there are associated the green, yellow, orange and red colours respectively. FIG. 6 shows an example of how this result can be achieved. In this figure, the image displayed on a video terminal associated with the control device of a system according to the invention is diagrammatically shown. The displayed image diagrammatically represents the welding station in plan view. In the preferred embodiment of the invention, two sensor devices for each gate 6, 7 are provided, which are located at the front end and the rear end of the gate, respectively. Thus, the detection is carried out at the four front left, front right, rear left and rear right corners of the station. The displayed image in FIG. 6 includes a central area and left and right areas. The left area displays the values of a determined parameter (in the illustrated example, this parameter is the calculated value of the displacement at the top of the gate, but what is shown is applicable also to displaying the values of displacement detected by the sensors or the values of the resulting force exchanged between the body and each gate), respectively at the front end and the rear end of the left gate. Similarly, in the right area the displacement values calculated at the top of the right gate are displayed, at the front end and the rear end of the gate. At the central area, the average values are indicated respectively between the two front left end and front right values, between the two rear left and rear right values, between the two front left and rear left values and between the two front right and rear right values. Furthermore, the cell in which each value is displayed is coloured in the colour corresponding to the pre-established code, which associates a given colour with each given range of variation of the parameter, of the four ranges I–IV which have been mentioned above. In this manner, the user obtains a promptly perceivable information of the operating conditions of the system. In the case of the example of colour code which have been mentioned above, the ideal operating conditions take place when all the areas of the displayed image are green or also either green or yellow. The system is at the limit of acceptable operating conditions when some of the areas are of orange colour, whereas an immediate intervention is required if one or more of the areas of the displayed image are red.

Due the above mentioned measures, the system is therefore able to be controlled and if necessary adjusted in an immediate and easy manner.

Naturally, while the principle of the invention remains the same, the details of construction and the embodiments may widely vary with respect to what has been described and illustrated purely by way of example, without departing from the scope of the present invention.

What is claimed is:

1. A device for assembling structure of a motor-vehicle body or sub-assemblies thereof, comprising:
    an assembling station provided with assembling programmable means,
    conveyor means, for carrying at least a portion of the structure to be assembled to the assembling station and for taking the structure after it has been assembled out of the assembling station,
    at least one pair of locating and locking gates arranged on two opposite sides of the assembling station, provided with locating and locking devices for holding component elements of the structure to be assembled in the proper assembling position, while the assembling operation is being carried out, said gates being movable towards and away from each other, between an inoperative spaced condition, in which said locating and locking devices are disengaged from the structure to be assembled, and a closed operative condition, in which said locating and locking devices are able to engage the structure to be assembled, wherein:
    a) each locating and locking gate is an independent unit, having a base portion movable at the assembling station and adapted to be locked rigidly to a fixed structure of the station in the operative condition of the gate, and an active portion, carrying said locating and locking devices, which is connected to and extends upwardly from said base portion and is not connected directly to said fixed structure of the station in the operative condition of the gate, so as to remain free to undergo micro-deflections along a transverse direction relative to the longitudinal direction of the station, due to slight variations of the transverse dimension of the structure to be assembled with respect to a predetermined desired dimension,
    b) between said active portion of each locating and locking gate and said fixed structure there are interposed sensor means adapted to detect the micro-displacement of said active portion with respect to said fixed structure, due to said micro-deflection, at a predetermined distance from the locking region of the base portion to the fixed structure,
    c) said device further comprises means for processing signals coming from said sensor means and for calculating the displacement of the various regions of the active portion of each locating and locking gate, as a function of the distance from said locking region, as well as for calculating forces exchanged between each gate and the structure to be assembled.

2. Assembling device according to claim 1, wherein said active portion of each locating gate extends upwardly from said base portion.

3. Assembling device according to claim 2, wherein said assembling means are constituted by programmable robots provided with electric spot welding heads.

4. Assembling device according to claim 1, wherein said sensor means comprises a stylus sensor arranged immediately above the base portion of the respective locating gate.

5. Assembling device according to claim 1, wherein said sensor means comprise first sensor means and second sensor means respectively arranged at the front end and the rear end of each locating and locking gate, so that the detection is carried out at the four front left, front right, rear left, rear right corners of the assembling station.

6. Assembling device according to claim 5, wherein with said processing means there are associated displaying means for displaying a diagrammatic image in plan view of the assembling device, where the values of a parameter are displayed, chosen among the displacement detected by said sensor means, the calculated displacement at the top of each gate, or yet the resulting force exchanged between each gate and the structure to be assembled, respectively at the front left, front right, rear left and rear right corners of the device, said image displaying also the average values respectively calculated between the values at the front left and front right corners, between the values at the rear left and rear right corners, between the values at the front right and rear right corners and between the values at the front left and rear left corners.

7. Assembling device according to claim 6, wherein in said diagrammatic image, with each of said values there is associated one colour, according to a colour code assigning given colours to given ranges of variation of said parameter.

8. A method for assembling structure of a motor vehicle bodies or sub-assemblies thereof, comprising the steps of;
    providing an assembling station with assembling programmable means;
    carrying at least a portion of the structure to be assembled to the assembling station with a conveyor means for taking the structure after it has been assembled out of the assembling station;
    providing at least one pair of locating and locking gates arranged on two opposite sides of the assembling station provided with locating and locking device;
    holding the component elements of the structure to be assembled in the proper assembling position while assembling the component elements, said gates being movable towards and away from each other, between an inoperative spaced condition, in which said locating and locking devices are disengaged from the structure to be assembled, and an operative closed condition in which said locating and locking devices are able to engage the structure to be assembled, wherein said method further comprises the following steps:
    providing each locating and locking gate as an independent unit, with a base portion movable in the assembling station and adapted to be locked rigidly to a fixed structure of the station in the operative condition of the gate, and an active portion carrying the locating and locking devices, which is connected to and extends upwardly from said base portion and is not connected directly to said fixed structure of the station in the operative condition of the gate, so as to remain free to undergo micro-deflections in a direction transverse relative to the longitudinal direction of the station, due to slight variations of the transverse dimension of the structure to be assembled with respect to a predetermined desired dimension, after said gates have been brought out and locked in said closed operative position, detecting the micro-displacement of said active portion of each gate with respect to said fixed structure, due to said micro-deflection, at a predetermined distance from the locking area of the base portion to the fixed structure, on the basis of thus detected micro-displacement, calculating the micro-displacement of the various regions of the active portion of each locating and locking gate as a function of the distance from said locking region, and calculating the force exchanged between each gate and the structure being assembled.

* * * * *